United States Patent Office 2,912,460
Patented Nov. 10, 1959

2,912,460

BASICALLY SUBSTITUTED CARBOXYLIC ACID AMIDES AND A PROCESS OF PREPARING THEM

Gustav Ehrhart and Heinrich Ruschig, Bad Soden (Taunus), Walter Aumuller, Frankfurt am Main, Leonhard Stein, Bad Soden (Taunus), and Leopold Ther, Frankfurt am Main, Germany, assignors to Farbwerke Hoechst Aktiengesellschaft vormals Meister Lucius & Brüning, Frankfurt am Main Hochst, Germany, a company of Germany No Drawing. Application August 13, 1953
Serial No. 374,122

Claims priority, application Germany August 18, 1952

3 Claims. (Cl. 260—562)

The present invention relates to basically substituted carboxylic acid amides obtained by reacting an aminocarboxylic acid or its derivatives with an aniline substituted in 2-position by a halogen atom and in 6-position by a lower alkyl radical and to a process of making them. More particularly, it relates to basically substituted acetanilides substituted in 2-position by chlorine and in 6-position by methyl and having a secondary nitrogen atom derived from the amino acid.

Basically substituted acetanilides are known to be good anesthetics. Thus, ω-diethylamino-3-carbomethoxy-4-hydroxy-acetanilide described, for example, in German specification No. 106,502 exhibits good therapeutic properties; it has, however, a highly irritating effect. Löfgren has described the production of a great number of substituted acetanilides, among which ω-diethylamino-2,6-dimethylacetanilide shows the best anesthetic properties and, consequently, has gained importance in practice (cf. Löfgren, Studies on Local Anesthetics, Xylocaine, Stockholm, 1948).

Now, we have found that basically substituted carboxylic acid amides suitable for use in pharmacology can be obtained by acylating a 1-aminobenzene, substituted in 2-position by a halogen atom and in 6-position by a lower alkyl radical, with a low molecular aliphatic aminocarboxylic acid or its derivatives and, if desired, by alkylating the resultant products at the nitrogen atom derived from the amino acid, or by first acylating a 1-aminobenzene, substituted in 2-position by halogen and in 6-position by a lower alkyl radical, with a low molecular halogen carboxylic acid or its derivatives and then condensing the halogen acylamide so obtained with ammonia or a primary or secondary amine.

The compounds of the invention correspond to the following formula

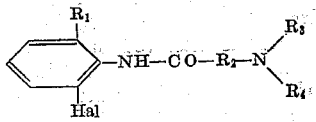

wherein $R_1$ stands for a lower alkyl radical, $R_2$ stands for a lower alkylene radical, $R_3$ and $R_4$ represent hydrogen or lower alkyl and taken tobether with —N< may stand for a hydrogenated heterocyclic radical, and Hal represents halogen.

As 1-aminobenzenes substituted in 2-position by halogen and in 6-position by a lower alkyl radical there may be mentioned, for instance: 1-amino-2-chloro-6-methylbenzene, 1-amino-2-iodo-6-ethylbenzene, 1-amino-2-chloro-6-butylbenzene, 1-amino-2-bromo-6-methylbenzene, 1-amino-2-bromo-6-propylbenzene, 1-amino-2-chloro-6-isopropylbenzene, 1-amino-2-chloro-6-ethylbenzene and the like.

As low molecular aminocarboxylic acids there can be used, for instance: glycocoll, alanine, β-aminopropionic acid, α-aminobutyric acid, dimethylaminoacetic acid, n-butylaminoacetic acid, isopropylaminoacetic acid, diethylaminoacetic acid, diethylaminopropionic acid, dibutylaminopropionic acid, isopropyl-methylaminopropionic acid, piperidinoacetic acid, α-pyrrolidinopropionic acid and the like.

As low molecular halogen carboxylic acids there are mentioned, for example: chloroacetic acid, α-chloropropionic acid, β-chloropropionic acid, α-chlorobutyric acid, the corresponding bromo or iodo compounds, such as bromoacetic acid, iodoacetic acid and the like. For the acylation there are suitably used the derivatives of the aminocarboxylic acid or halogen carboxylic acid, such as acid chlorides, acid esters and the like.

As primary or secondary amines are used, for instance: monomethylamine, monoethylamine, dimethylamine, diethylamine, butylamine, dibutylamine, hydrogenated heterocyclic bases, if desired, substituted by alkyl radicals, such as pyrrolidine, piperidine, 4-methylpiperidine, morpholine and the like.

The reaction of 1-amino-2-methyl-6-halogen-benzene with the derivatives of halogen carboxylic acid is advantageously carried through in a solvent. As solvents there can be used, for example: glacial acetic acid, benzine, methylcyclohexane, aromatic hydrocarbons, such as benzene, toluene or xylene, chlorinated hydrocarbons, such as chlorobenzene, chloroform, carbon tetrachloride and the like. The reaction of the resultant 1-halogen-acylamino-2-methyl-6-halogen-benzene with the primary or secondary amines may be carried through in the presence or absence of indifferent solvents.

The hydrogen chloride set free by the reaction of 1-amino-2-methyl-6-halogen-benzene with the halogen acyl halides can be bound by the addition of a corresponding excess of 1-amino-2-methyl-6-halogen-benzene. When working in a solvent miscible with water, another agent capable of binding mineral acid may be added, for example sodium hydroxide solution or sodium acetate. When the reaction is carried through, for example, in an indifferent hydrocarbon or chlorinated hydrocarbon, the hydrogen halide may be expelled by heating.

If an alkylation is desired, the reaction products may be alkylated in known manner, for example with the aid of alkyl halides.

The reaction proceeds, for instance, according to the following scheme:

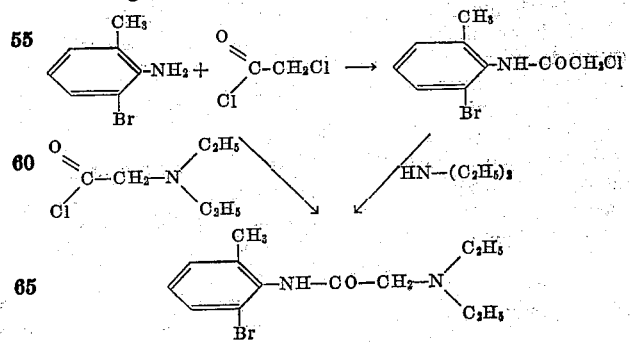

The compounds of the invention have excellent anesthetic properties and are well soluble in water in the form of their salts which can be obtained by means of organic or inorganic acids, for example: acetic acid, lactic acid, aminosulfonic acid, phosphoric acid, hydrochloric acid and hydrobromic acid. The salts are exceedingly stable and can easily be sterilized; this, however, is not necessary when they are used in therapy since the compounds themselves have a bactericidal action.

Especially the 2-chloro-6-methylacetanilides carrying only one lower alkyl radical at the ω-nitrogen atom are valuable compounds. Thus, ω-n-butylamino-2-methyl-6-chloracetanilide-hydrochloride, for example, is distinguished from ω-diethylamino-2.6-dimethylacetanilide-hydrochloride by its considerably quicker anethetic action and a far better detoxication of the compounds in the organism. When testing the interruption of the nerve conduction produced by ω-diethylamino-2.6-dimethylacetanilide-hydrochloride (I) and ω-n-butylamino-2-methyl-6-chloracetanilide-hydrochloride (II) in the frog's sciatic nerve, the following results were obtained:

| Concentration | Number of tests made | no leg adductor reflex after minutes in percent of tests | | | | |
|---|---|---|---|---|---|---|
| | | 3 | 6 | 9 | 12 | 15 |
| I. 0.25% | 348 | 17.6 | 30.7 | 22.2 | 13.8 | 6.6 |
| II. 0.25% | 170 | 36 | 39.5 | 20 | 3.5 | 1 |

The above table shows that by ω-diethylamino-2.6-dimethylacetanalide-hydrochloride the frog's sciatic nerve was blocked within 6 minutes in 48.3% of the cases tested, whereas by ω-n-butylamino-2-methyl-6-chloracetanilide-hydrochloride in 75.5% of the test.

When rabbits were used as test animals and a continuous drip of 4 mg./per kilogram of bodyweight was made per minute, the rabbit was still alive after the infusion of a total of 232 mg./kilogram of ω-n-butylamino-2-methyl-6-chloracetanilide-hydrochloride, whereas the animal succumbed after infusion of about 60 mg./kilogram of ω-diethylamino-2.6-dimethylacetanilide-hydrochloride.

In mice, the following values of subcutaneous toxicity were ascertained:

Lethal dose $_{50}$, mg./kilogram
ω-Diethylamino-2.6-dimethyl-acetanilide - hydrochloride _____ 250
ω-n-Butylamino-2-methyl-6-chloracetanilide - hydrochloride _____ 750

Hence the toxicity of ω-n-butylamino-2-methyl-6-chloracetanilide-hydrochloride is about equal to that of procaine. Since ω-n-butylamino-2-methyl-6-chloracetanilide - hydrochloride has proved to be a stronger regional anesthetic than ω-diethylamino-2.6-dimethylacetanilide - hydrochloride but exhibits considerably lower toxicity than the latter when administered subcutaneously, the lower toxicity must be due to a considerably increased velocity of detoxication. Tests in rabbits have shown that ω-n-butylamino-2-methyl-6-chloracetanilide - hydrochloride is detoxicated about 5 times faster than ω-diethylamino-2.6-dimethylacetanilide-hydrochloride. This increased velocity of detoxication is due to the fact that after being absorbed in the liver, ω-n-butylamino-2-methyl-6-chloracetanilide-hydrochloride is split by enzymes (dipeptidases) and thus detoxicated.

As tests have shown, the cleavage products are absolutely non-toxic. Rats, cats, rabbits and dogs were given repeated doses but on autopsy no detrimental effect on the parenchymatous organs could be detected.

Clinical tests fully confirmed the results ascertained by the pharmacological tests. In dentistry, a solution of ω-n-butylamino-2-methyl-6-chloracetanilide-hydrochloride of 2 or 3% strength was used in numerous cases of regional or infiltration anesthesia. In the case of infiltration anesthesia, complete analgesia was produced already in 1 to 2 minutes, in the case of regional anesthesia in about 2 to 3 minutes. A satisfactory analgesia was produced by ω-n-butylamino-2-methyl-6-chloracetanilide-hydrochloride even in inflammations of the maxillary and mandibulory region. This is remarkable since, as is well-known, said inflammations render anesthesia particularly difficult. ω-n-butylamino-2-methyl-6-chloracetanilide-hydrochloride was also applied in many cases of major or minor surgery. Besides in surgical interventions in ambulant patients, such as wound toilet, amputations of small extremities and the like, ω-n-butylamino-2-methyl-6-chloracetanilide-hydrochloride has successfully been applied in strumectomy, herniotomy, tonsillectomy and the like. In all cases a surprisingly rapid and deep anesthesia was effected, no symptoms of intolerability to be attributed to the preparation were stated.

The following examples serve to illustrate the invention but they are not intended to limit it thereto:

Example 1

(a) A solution of 56 grams of chloracetyl chloride in 300 cc. of benzene is added to a solution of 142 grams of 1-amino-2-methyl-6-chlorobenzene in 1200 cc. of benzene. Heating takes place spontaneously and crystals of hydrochloric 1-amino-2-methyl-6-chlorobenzene separate. After the reaction mixture has been allowed to stand overnight, ether is added and the crystals are filtered off with suction. The filtrate is evaporated to dryness, and the crude product obtained is recrystallized from isopropyl alcohol. The resultant 1-(chloracetyl-amino)-2-methyl-6-chlorobenzene melts at 139° C.–140° C.

(b) 21.8 grams of 1-(chloracetylamino)-2-methyl-6-chlorobenzene, 21.9 grams of diethylamine and 120 cc. of benzene, are heated to boiling for six hours under reflux. After the reaction mixture has been allowed to stand overnight, the diethylamino-hydrochloride obtained is filtered off with suction, a little ether is added to the filtrate, and the solution is extracted twice with dilute hydrochloric acid. The hydrochloric acid extracts are rendered alkaline by means of potassium carbonate and are then extracted with ether. The ether solution is dried over potassium carbonate, and the ether and the excess of diethylamine are then distilled off. The remaining crude 1-(diethylamino-acetylamino)-2-methyl-6-chlorobenzene is dissolved in ether and precipitated with alcoholic hydrochloric acid as hydrochloride which is further purified by recrystallization from acetone. It melts at 140° C.

Example 2

27 grams of 1-(chloracetylamino)-2-methyl-6-chlorobenzene obtained according to Example 1a are dissolved in 150 cc. of n-butylamine. Evolution of heat takes place spontaneously with the reaction. After the reaction mixture has been allowed to stand overnight, the excess of free butylamine is distilled off, and the residue is dissolved by shaking it with ether and soda solution. The ether solution is separated and dried over potassium carbonate. The ether and the butylamine are distilled off, and the residue is dissolved in ether. To the solution so obtained alcoholic hydrochloric acid is added. 31 grams of 1-(butylamino-acetylamino)-2-methyl-6-chlorobenzene-hydrochloride crystallize out which are further purified by recrystallization from ethyl alcohol. Melting point=232° C.

Example 3

(a) 141.6 grams of 1-amino-2-methyl-61chlorobenzene are dissolved in 850 cc. of glacial acetic acid. After cooling to 10° C–15° C., 124 grams of cloracetyl chloride are added, while stirring. To the clear solution so obtained a solution of 330 grams of sodium acetate (CH₃COONa.3H₂O) in about 1.4 liters of water is then added as quickly as possible while stirring vigorously. A white crystal mass of 1-(chloracetylamino)-2-methyl-6-chlorobenzene is obtained in a good yield. It is stirred for one hour, then filtered off with suction and thoroughly washed with water. After being dried, the compound melts at 139° C., whereas a sample recrystallized from benzene/petroleum ether melts at 142° C.

(b) To 500 cc. of methanol, saturated by means of ethylamine while cooling with ice, there are added 84 grams of crude 1-(chloracetylamino)-2-methyl-6-chlorobenzene (obtained as described above and sharply filtered off with suction), and further ethylamine is introduced. The temperature rises to about 40° C. After the reaction mixture has been allowed to stand overnight, the alcohol is distilled off and the residue is dissolved in dilute hydrochloric acid. The solution is rendered alkaline by means of potassium carbonate and the basic constitutents are taken up in ether. After the ether solution has been dried with potassium carbonate, the ether is distilled off and the base is distilled. After small first runnings, there are obtained 107 grams of 1-(ethylamino-acetylamino)-2-methyl-6-chlorobenzene distilling over at 156° C. under a pressure of 2 mm. The product obtained is dissolved in ethanol, and 1-(ethylamino-acetylamino)-2-methyl-6-chlorobenzene-hydrochloride is precipitated by the addition of alcoholic hydrochloric acid. After being recrystallized from ethanol, the product melts at 277° C. with decomposition.

*Example 4*

27 grams of 1-(chloracetylamino)-2-methyl-6-chlorobenzene (obtained as described in Example 3a), are introduced into 150 cc. of n-propylamine. After the reaction mixture has been allowed to stand overnight, the excess of propylamine is distilled off under reduced pressure, and the residue is shaken with ether and soda solution. The ether solution is dried, and the ether and the execss of propylamine are distilled off. 1-(propyl-amino-acetylamino) - 2-methyl - 6 - chlorobenzene is obtained as a residue. By the method described in Example 2 it can be converted into the hydrochloride which is obtained in a very good yield. Melting point 261° C. (with decomposition).

*Example 5*

27 grams of 1-(chloracetylamino)-2-methyl-6-chlorobenzene, obtained according to Example 3a, are dissolved in 200 cc. of allylamine of 71 percent strength. After a short time, spontaneous heating takes place. After standing overnight, the reaction mixture is worked up as described in Example 2, and 1-(allylamino-acetylamino)-2-methyl-6-chlorobenzene-hydrochloride is obtained in a good yield. It melts at 277° C. (with decomposition) after recrystallization from methanol.

*Example 6*

When 27 grams of 1-(chloracetylamino)-2-methyl-6-chlorobenzene are reacted with isobutylamine and worked up as described in Example 2, 1-(isobutylamino-acetyl-amino)-2-methyl-6-chlorobenzene-hydrochloride is obtained. It melts at 209° C. after recrystallization from methanol.

*Example 7*

34 grams of α-bromo-propionylchloride are added to a solution of 56 grams of 1-amino-2-methyl-6-chlorobenzene in 500 cc. of benzene. After standing for one day, the benzene solution is shaken with water, the benzene layer is separated and most of the benzene is distilled off. On the addition of cyclohexane, 1-(α-bromo-propionylamino) - 2 - methyl-6-chlorobenzene crystallizes out. Melting point=145° C.-147° C. 150 cc. of butylamine are poured over 40 grams of the compound so obtained. After the whole has been allowed to stand for several hours, the excess of butylamine is distilled off. The residue is taken up in ether, the ether is then shaken with water and distilled off. The residue is dissolved in acetone and neutralized by means of ethereal hydrochloric acid. On the addition of ether, 1-(α-bu-tylamino - propionylamino) - 2-methyl-6-chlorobenzene-hydrochloride crystallizes out in a yield of 90%. Melting point=145° C.-147° C.

*Example 8*

56 grams of 1-amino-2-methyl-6-chlorobenzene are dissolved in 500 cc. of benzene, and a solution of 25.4 grams of β-chloropropionic acid chloride in 200 cc. of benzene is added. After standing for one day, the whole is shaken with water, and the benzene solution is separated and concentrated to a small volume. On the addition of cyclohexane, 1 - (β - chloropropionylamino)-2-methyl-6-chlorobenzene crystallizes out. Melting point =105° C.–107° C.

To the chlorine compound so obtained the threefold amount of butylamine is added. The reaction terminated, the mixture is worked up as described in Example 7. 35 grams of 1-(β-butylamino-propionylamino)-2-methyl-6-chlorobenzene-hydrochloride melting at 224° C.-226° C. are obtained.

*Example 9*

16.5 grams of β-piperidino-propionic acid chloride-hydrochloride are finely pulverized and mixed with 45 grams of 1-amino-2-methyl-6-chlorobenzene. Slight spontaneous heating takes place. The mixture is treated for about one hour on the steam bath. During this operation β - piperidino - propionic-acid-chloride-hydrochloride dissolves and a fine crystalline precipitate separates. After cooling, the reaction mixture is shaken with ether and potassium carbonate solution, and the ether solution is dried over potassium carbonate. The ether is distilled off and the residue is distilled under reduced pressure. At first the non-reacted starting material distills over at 118° C. under a pressure of 28 mm. and then 1-(β-piperi-dino-propionylamino)-2-methyl-6-chlorobenzene distills at 186° C. under a pressure of 2 mm. The latter is a viscous light-colored oil, that crystallizes after some time. The yield amounts to about 17 grams. In order to convert the compound into the hydrochloride, the base is taken up in ether and to the solution so obtained alcoholic hydrochloric acid is added. By the addition of ethyl acetate, 1 - (β - piperidino-propionylamino) - 2-methyl-6-chlorobenzene-hydrochloride crystallizes from the precipitated smears. After recrystallization from ethanol, the product melts at 182° C.-183° C.

*Example 10*

In a round-bottomed flask with ground-in condenser 47.3 grams of chloracetic acid and 71 grams of 1-amino-2-methyl-6-chlorobenzene are thoroughly mixed. 38.3 grams of phosphorus oxychloride are then led in through the condenser. Vigorous reaction sets in immediately. Spontaneous heating takes place and the reaction mass froths with evolution of hydrogen chloride and finally forms a clear solution which soon solidifies to a compact crystal cake. The latter is heated for a short time in the water-bath until the evolution of hydrochloric acid is terminated, then it is allowed to cool, ground with ice-water and filtered off with suction. After drying, 1-(chloro-acetylamino)-2-methyl-6-chlorobenzene is obtained in a very good yield. After being dissolved once and recrystallized from ethyl acetate, the product melts at 142° C.

200 grams of dry, crude 1-(chloroacetylamino)-2- methyl-6-chlorobenzene are dissolved in 1 liter of n-butylamine. Gradually reaction sets in with the evolution of heat. By suitably cooling, the temperature is kept between 40° C. and 60° C. After the reaction mixture has been allowed to stand overnight, the excess of butylamine is drawn off under reduced pressure. The residue is treated with about 1 liter of 2 N-hydrochloric acid. A thick magma of 1 - (n - butylamino-acetylamino)-2-methyl-6-chlorobenzene-hydrochloride is obtained which, after standing overnight, is filtered off with suction and washed with a little water. After drying in a desiccator, 250 grams are obtained. The product is purified by recrystallization from water with use of animal charcoal. Melting point=232° C.

*Example 11*

A mixture of 100 kilograms of absolute benzene, 17.5 kilograms of 1-amino-2-methyl-6-chlorobenzene and 15 kilograms of chloracetyl chloride is slowly heated under reflux. At 60° C. splitting off of hydrogen chloride sets in which is completed after boiling for about 3 hours under reflux. On cooling, 1-(chloroacetylamino)-2-methyl-6-chlorobenzene crystallizes from the clear light-colored benzene solution. 24.3 kilograms (90 percent of the theoretical yield) of purely white crystals melting at 144° C. are obtained. The yield can be increased by working up the mother liquor. Instead of benzene other hydrocarbons may be used as solvents, for example, benzine, methylcyclohexane, the homologues of benzene, such as toluene or xylene, chlorinated hydrocarbons, such as chlorobenzene, chloroform or carbon tetrachloride.

25 kilograms of 1-(chloracetylamino)-2-methyl-6-chlorobenzene are introduced into 25 kilograms of n-butylamine, the temperature of the mixture rising to about 55° C. After some hours the excess of butylamine is distilled off and 150 kilograms of water and about 4.5 kilograms of concentrated hydrochloric acid are added to the residue. The mixture is then heated until formation of a clear solution takes place. On cooling, 1-(butylamino - acetyl - amino)-2-methyl-6-chlorobenzene-hydrochloride crystallizes out in the form of fine white needles. The yield amounts to 25 kilograms. Melting point =235° C.–236° C. The compound can be recrystallized from water.

*Example 12*

13.0 kilograms of β-chloropropionic acid chloride are added to a solution of 14.1 kilograms of 1-amino-2-methyl-6-chlorobenzene in 75 kilograms of toluene, and the solution obtained is stirred for 5 hours at 80° C.–85° C. On cooling, 1-(chloropropionylamino)-2-methyl-6-chlorobenzene crystallizes out. The yield amounts to 21 kilograms (=90 percent of the theoretical yield). Melting point=112° C.

By working up the mother liquor further amounts of 1-(chloropropionylamino)-2-methyl-6-chlorobenzene can be obtained.

21 kilograms of 1-(chloropropionylamino)-2-methyl-6-chlorobenzene are introduced into 80 kilograms of n-butylamine, the temperature of the reaction mixture rising to about 50° C.–60° C. After some hours, the excess of butylamine is distilled off under reduced pressure. To the residue 125 kilograms of hot water are added and concentrated hydrochloric acid is then introduced until a pH of 4.5 is reached. On cooling, 1-(butylamino-propionyl - amino)-2-methyl-6-chlorobenzene hydrochloride crystallizes out in the form of long white needles melting at 238° C. The yield amounts to 22 kilograms.

*Example 13*

31 grams of chloracetyl chloride are slowly added to 35.5 grams of 1-amino-2-methyl-6-chlorobenzene in a round-bottomed flask with reflux condenser, while shaking, and the whole is heated in the oil-bath to 150°C.–160° C. When the evolution of hydrochloric acid is terminated, the melt is allowed to cool down. 1-(chloracetylamino)-2-methyl-6-chlorobenzene obtained is dissolved in about 400 cc. of n-butylamine. Spontaneous heating of the solution takes place. After the reaction mixture has been allowed to stand overnight or has been heated for a short time on the steam-bath, the excess of butylamine is distilled off and the residue is ground with dilute hydrochloric acid. After filtering off with suction, 1-(butylaminoacetylamino)-2-methyl-6-chlorobenzene-hydrochloride obtained in a very good yield is recrystallized from water or alcohol. Melting point=232° C.

*Example 14*

71 grams of 1-amino-2-methyl-6-chlorobenzene are covered in a filtering jar with a layer of 1.5 liters of water, and a solution of 165 grams of crystallized sodium acetate ($3H_2O$) in 700 cc. of water is added. 1 to 2 cc. of a partial ester of a fatty acid of a sorbitol polyglycol ether are added as emulsifier, while stirring vigorously, and to the milky emulsion obtained 68 grams of chloracetyl chloride are slowly added drop by drop. A crystalline precipitate of 1-(chloracetylamino)-2-methyl-6-chlorobenzene is obtained. After being stirred for one hour, the precipitate is sharply filtered off with suction and washed with dilute hydrochloric acid and water.

The compound obtained melts at 138° C., and after recrystallization from ethyl acetate at 142° C. The yield amounts to about 75 grams.

27 grams of the crude 1-(chloracetylamino)-2-methyl-6-chlorobenzene which has been sharply filtered off with suction are reacted with n-propylamine according to Example 4. 1-(n-propylamino-acetylamino)-2-methyl-6-chlorobenzene-hydrochloride is obtained in a very good yield. Melting point=261° C.

*Example 15*

(*a*) 11.2 grams of 1-amino-2-methyl-6-bromobenzene are dissolved in 50 cc. of glacial acetic acid. The solution is cooled to +10° C., and 7.83 grams of chloracetyl chloride are added, while stirring, whereby the temperature rises a little. While further stirring, a solution of 20 grams of sodium acetate ($3H_2O$) in 85 cc. of water is added and a crystalline precipitate of 1-(chloracetylamino)-2-methyl-6-bromobenzene is obtained. The crystals are filtered off with suction and washed with water. After drying on the steam-bath, 12.1 grams of the product are obtained. The product melts at 143° C.–144° C. after recrystallization from ethyl acetate.

(*b*) 11.1 grams of the crude 1-(chloracetylamino)-2-methyl-6-bromobenzene obtained as described above are dissolved in 100 cc. of n-butylamine. After a short time the temperature rises to 46° C. The reaction mixture is allowed to stand overnight, the excess of butylamine is then distilled off under reduced pressure and the residue is ground with dilute hydrochloric acid. A crystal magma of 1 - (butyl-amino-acetylamino)-2-methyl-6-bromobenzene-hydrochloride is obtained which is filtered off with suction and dried. The yield amounts to 11.2 grams. The product is purified by recrystallization from water or ethanol. Melting point=221° C. with slight decomposition.

We claim:

1. The compound of the formula

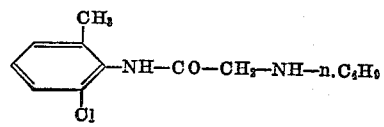

2. A non-toxic acid addition salt of the compound of the formula

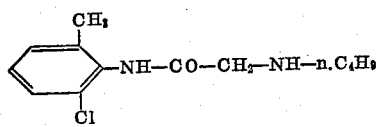

3. The hydrochloric acid addition salt of the compound of the formula

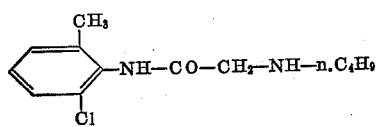

References Cited in the file of this patent

UNITED STATES PATENTS

| | | |
|---|---|---|
| 2,343,071 | Martin et al. | Feb. 29, 1944 |
| 2,676,188 | Bruce et al. | Apr. 20, 1954 |

FOREIGN PATENTS

| | | |
|---|---|---|
| 282,881 | Switzerland | Sept. 1, 1952 |

OTHER REFERENCES

Lofgren: Arkiv for Kemi, Mineralogi Och Geologi, vol. 22A (1946), pp. 1 to 11, 13 and 14.

Lofgren et al.: Svensk Kem. Tid., vol. 58 (1946), pp. 206, 212, 214, 215 and 222.